UNITED STATES PATENT OFFICE.

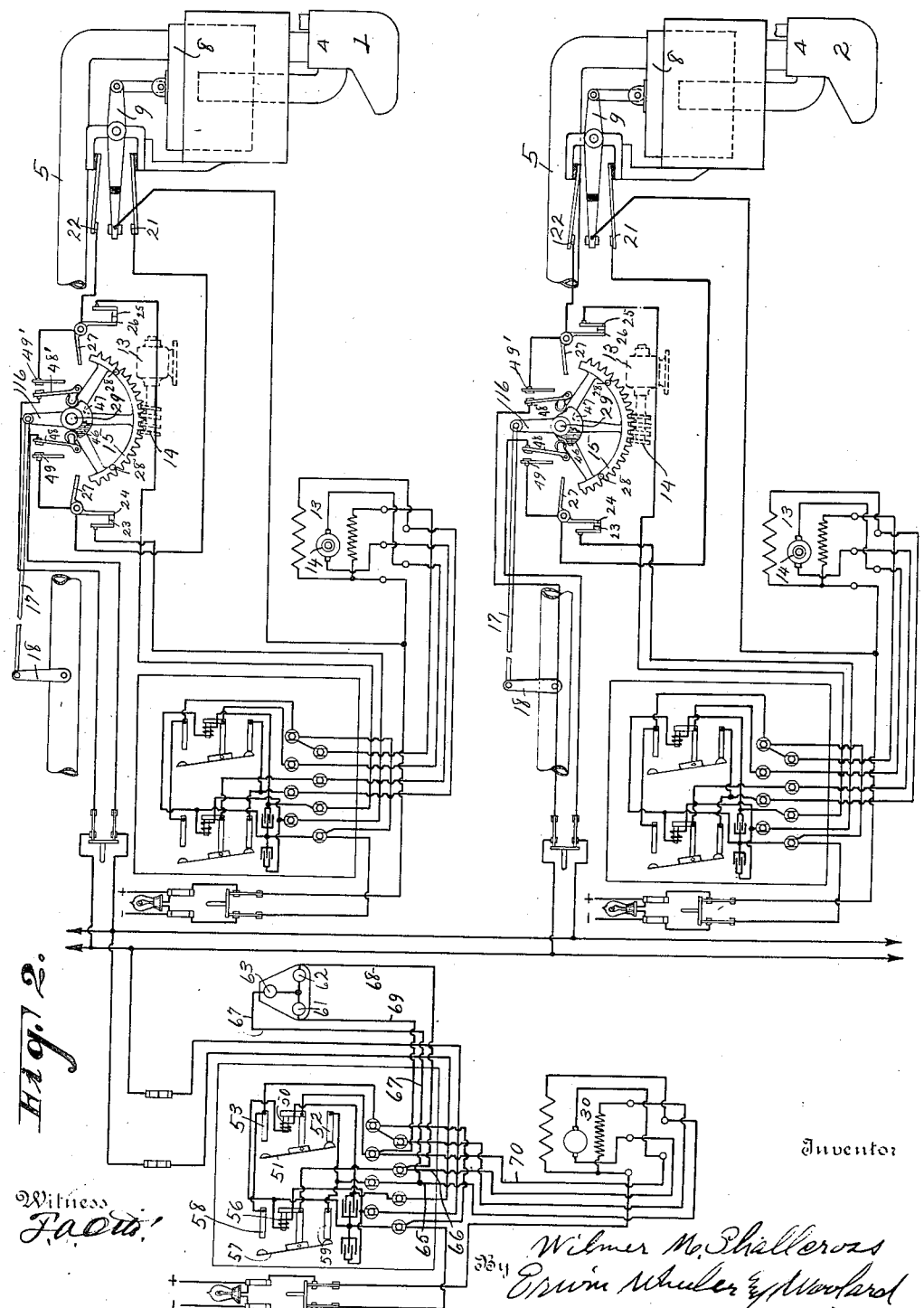

WILMER M. SHALLCROSS, OF MILWAUKEE, WISCONSIN, ASSIGNOR TO NORTHWESTERN MANUFACTURING COMPANY, OF MILWAUKEE, WISCONSIN, A CORPORATION OF WISCONSIN.

AUTOMATIC REGULATOR FOR COKE OVENS.

1,424,042.  Specification of Letters Patent.  Patented July 25, 1922.

Application filed September 27, 1919. Serial No. 326,847.

*To all whom it may concern:*

Be it known that I, WILMER M. SHALLCROSS, a citizen of the United States, residing at Milwaukee, county of Milwaukee, and State of Wisconsin, have invented new and useful Improvements in Automatic Regulators for Coke Ovens, of which the following is a specification.

My invention relates to improvements in pressure regulating methods, and also to improvements in pressure regulating apparatus for low pressure or sub-atmospheric pressure systems in which a constantly operating exhauster is employed in connection with one or more sources of supply, operating under varying conditions, the exhauster being utilized in connection with suitable throttle valves adapted to control the suction upon each source of supply in a predetermined relation to the quantity of gas, or to the pressure thereof at the source.

My invention is particularly adapted for use in controlling the pressure of the by-product gases from coke ovens, whereby these gases may be withdrawn in such a manner that the pressure thereof in the ovens may be kept substantially constant, notwithstanding the fact that varying conditions of fuel and of combustion, result in a widely varying quantity of gas to be delivered from the ovens during the coking process.

It is common to connect a series of blocks or sets of coke ovens in a single system, having exhaust ducts leading to a common main connected with a single exhauster or exhaust pump, the suction of which, upon each block of ovens, is regulated by means of gate or butterfly valves, and it has heretofore been common to employ pressure controlled regulators to individually adjust the valves in accordance with the requirements of the associated set or block of ovens.

It has also been attempted to provide means for regulating the speed of the exhauster in proportion to the total quantity of gas delivered through the main, or in proportion to the pressure within the main. But it has been found that independently actuated valves in the ducts leading to the main react in operation to produce readjustments of the exhauster regulator, and of other valves in the system, thereby producing so-called "hunting or see-sawing" effects.

The object of my invention is to provide a more effective method of pressure regulation by utilizing individual regulators, associated with the respective exhaust ducts, to not only position the throttle valve in such duct, but to also correspondingly control the speed of the exhauster; to provide for a co-operative action of all the regulators in an oven system to control the speed of the exhauster; to further provide for an automatic control of the exhauster speed, of such character as to keep all the valves at, or near, their most effective operating position; to eliminate so-called "hunting or see-sawing" tendencies; to reduce to a minimum the duration of the periods of regulation, and the number of regulating periods, and to provide a system of signals, whereby the operator may be advised at all times of any variations in exhauster speed, or of any failure of the system to accomplish complete automatic control.

While I have illustrated and described my invention as applied to a multiple block system of coke ovens, it is also applicable to control a single oven or block of ovens to prevent hunting or see-sawing tendencies, since the oven regulator and the exhauster regulator will have a tendency to control the action of the other.

In the drawings:—

Figure 2 is a diagrammatic illustration of the electrical connections and circuit closers.

Like parts are identified by the same reference characters throughout the several views.

Figure 1:
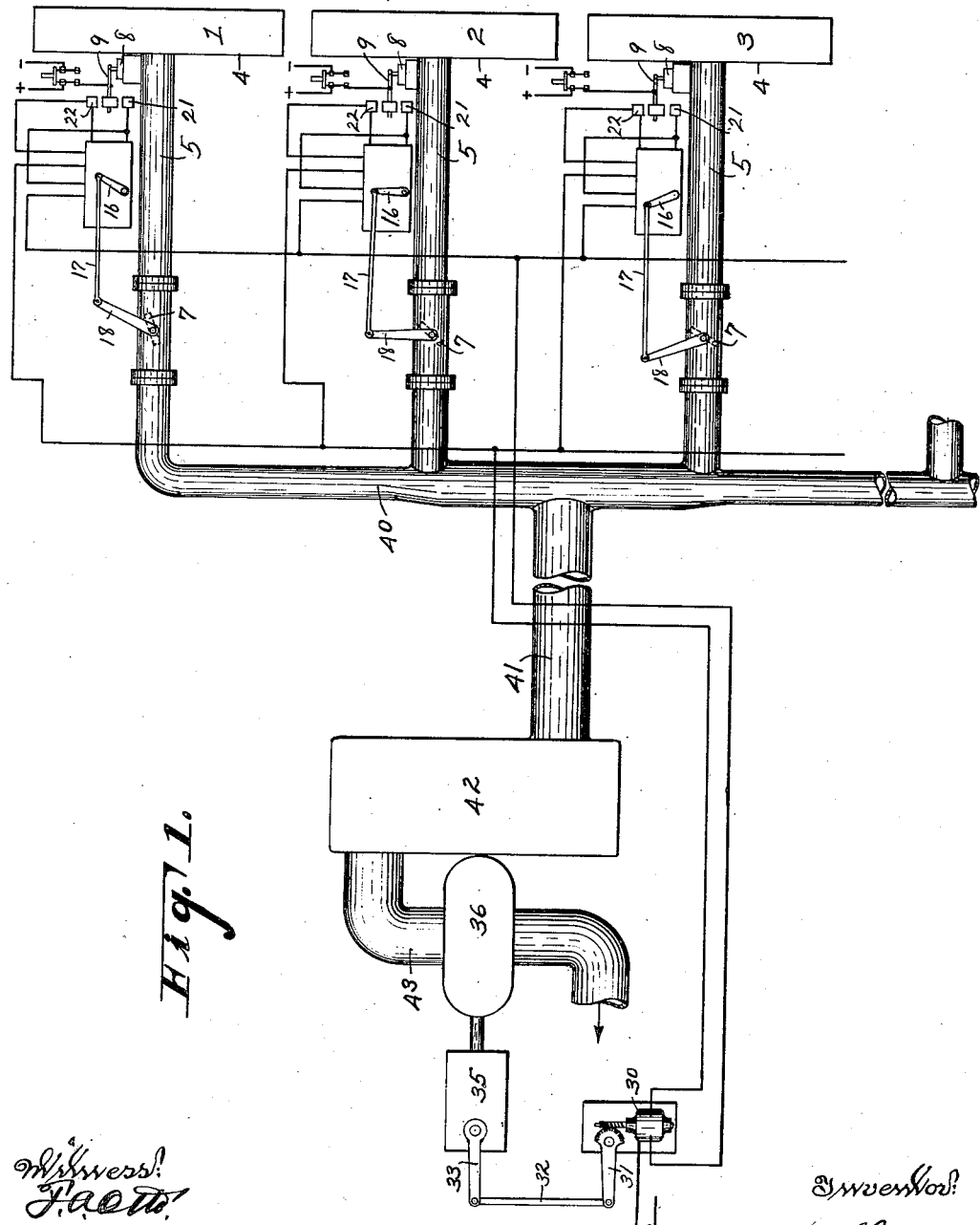
Figure 1 is a conventional illustration, in plan, of a method of regulation embodying my invention in its preferred form, as used to control the exhaust of gas from a series of so-called blocks of coke ovens connected with a single exhauster.

In Figure 1, I have conventionally illustrated three sets or blocks of coke ovens 1, 2 and 3, each provided with a collecting duct 4, and an outlet duct 5, through which the gas developed through the coking operation may be withdrawn from the ovens. Under ideal conditions, the pressure of the gas within the ovens should be kept substantially constant, and slightly above atmospheric pressure, i. e., sufficient to support a column of water from three to five millimeters in height, (below atmospheric pressure); and with a view to maintain this ideal condition, throttle valves 7 of the butterfly type are employed in the exhaust ducts 5, and sufficient suction exerted upon the exhaust ducts beyond the throttle valves to maintain a partial vacuum, i. e., to keep the pressure slightly below that of the atmosphere. The position of the throttle valve 7 is in each case regulated automatically by a motor, controlled under ordinary conditions by a pontoon switch mechanism having a gas bell 8 linked to a switch lever 9, in a manner similar to that disclosed in the patent to Ells No. 1,172,774, dated Feb. 22, 1916, for improvements in automatic pressure controlled valve mechanism, the general mode of operation being as follows.

As disclosed in said former patent, the throttle valves 7 are each actuated by a reversible motor 13 having a worm shaft 14, which transmits motion to the valve through a gear segment 15, arm 16, link 17, and valve lever 18. The circuit of the motor is controlled in part by a pontoon switch, the bell 8 of which is subject to gas pressure in the hydraulic main or collecting duct of the ovens to move a switch arm 9 to the respective high and low pressure terminal contacts 21 and 22, whereby when the switch arm 9 moves to contact 21, a circuit will be closed in one direction through the motor to operate the latter and its associated gear segment 15 in a direction to open the corresponding valve 7. When the pressure in the collecting duct is reduced sufficiently to allow the gas bell 8 to move down until switch arm 9 engages terminal contact 22, a circuit will be closed through motor 13 in the opposite direction, and the motion thus developed transmitted through the segment to close the associated valve 7, until pressure in the collecting duct develops sufficiently to lift the bell until arm 9 draws away from contact 22 to again break the motor circuit.

If any valve 7 should reach the limit of its predetermined movement in either direction, (i. e., a substantially fully open or closed position), separate means, directly controlled by the gear segment 15, are provided for breaking the motor circuit and stopping the motor independently of the position of the pontoon switch arm 9. To accomplish this, I provide limit switches at the respective ends of the gear segment 15, these limit switches comprising sets of fixed and movable electrodes 23 and 24, 25 and 26 respectively. Each of the electrodes 24 and 26 has an arm 27 adapted to be engaged by a projection 28 on the segment to separate this electrode from its associated electrode 23, (or 25). Electrode 24 is in circuit with pontoon switch terminal 21, and electrode 26 is in circuit with terminal 22. Therefore, when the segment and its associated valve 7 reaches the limit of the valve opening movement, and lifts the electrode 24, it opens that motor circuit which has previously been closed by the pontoon switch through the terminal 21. Similarly, when the valve is being closed, and the segment reaches the limit of its movement in the other direction it breaks the circuit through the terminal 22 of the pontoon switch mechanism, by actuating the electrode 26 pertaining to that circuit.

The structure and arrangement above described is disclosed in my former application, but for the purposes of my present invention, I herein illustrate means for utilizing intermediate movements of the gear segment 15, and its supporting pivot shaft 29, to control the circuit of another motor for the purpose of varying the speed of an exhauster used for withdrawing gas from the collecting ducts. In this manner, it is possible to avoid the above mentioned extreme movements of the segments and their associated valves 7, by varying the rate of gas withdrawal from the ovens more nearly in direct proportion to the requirements, as indicated by the pontoons or the opening and closing movements of the valves 7.

*Exhauster control.*

In my improved apparatus, a speed regulating motor 30 is utilized to actuate an arm 31 which may be connected by a link 32 with a throttle valve lever 33 controlling the speed of an engine or power motor 35, which drives an exhauster 36. The exhauster 36 is used to withdraw the gas from the various outlet ducts 5 through a cross duct 40, main 41 and an initial cooling chamber 42, the gas thus withdrawn being delivered into a main 43 leading to cleaning and by-product departments (not shown). The speed regulating motor 30 and the power unit 35, (engine or motor), and also the exhauster 36, may be of any ordinary construction, and are merely illustrated conventionally, the present invention relating more particularly to the method of controlling the speed regulating motor 35 through the joint or co-acting operation of the various valve actuating mechanisms. The means for establishing this control will now be described.

Each of the gear segments 15 is fixed to a pivot shaft 29 which therefore oscillates with it. This shaft is provided with a set of rotatably adjustable cams 46 and 47. Cam 46 is adapted to actuate a circuit breaker 48 into circuit closing relation to a terminal 49 electrically connected with the contact electrode 24 of the high pressure circuit through contact 21. Therefore, when any gear segment 15 is actuated to open its associated valve 7 beyond its normal half open position, it will also actuate cam 46, and if the movement continues long enough, it will move a circuit breaker 48 to circuit closing position in contact with a terminal 49 before opening the limit switch by actuating member 24. The circuit through the terminal 49 extends through contact members 27 and 24, the circuit breaker 48, and the winding of an electro-magnet 50, which when energized, moves a motor controlling switch arm 51 associated with the motor 30 to motor starting position, the motor 30 being then operated in a direction to open the engine throttle and increase the speed of the engine 35, and of the exhauster 36. In this manner, the opening of any valve 7 is accompanied by an increase in the rate of gas withdrawal at the outlet.

Similarly the cam 47 operates a circuit breaker 48' into circuit closing relation to a terminal 49' connected with the electrode 26, associated with the low pressure terminal 22, whereby after a predetermined movement of a gear segment 15 to close its associated valve 7 beyond the normal half open position, a circuit may be closed in the opposite direction through the speed regulating motor 30, by first connecting up a circuit through the winding of an electro-magnet 56, which, when energized, shifts the motor switch 57 to motor starting position, whereby the motor is actuated in the opposite direction to reduce the speed of the engine and of the exhauster.

The circuit of the motor 30, when operated to increase the speed of the exhauster, is from the line through the series field of the motor, (Fig. 2), through switch contact 59, switch 57, the armature of the motor, and then through switch 51 to contact 53, and back to the opposite side of the line, this circuit being established by energizing magnet 50, as above described.

But when magnet 56 is energized, the circuit will be from the line through the series field as before, and then through switch contact 52 and switch 51 to the armature, through which it passes in the opposite direction to switch 57, and then through the contact 58 back to the line on the return side.

Therefore, inasmuch as the magnets 50 and 56 control the direction of the current through the motor armature, and inasmuch as these magnets depend for their energizing current upon the action of the cams 46 and 47, it is obvious that the operation of the motor will depend in part upon the direction of the movement controlling gear segment, and also upon the degree of movement being sufficient to carry the actuating cam 46, (or 47), into operative position for pushing the associated circuit breaker into circuit closing position to connect up the circuit with the magnet.

It will be observed in Figure 2 that whereas each block of ovens 1, 2, and 3, is provided with a separate pontoon switch mechanism, and a valve adjusting motor and gear segment, and each gear segment is provided with cams 46 and 47 controlling the action of motor 30, yet the circuits of the motor are dependent upon one of the switches 51 (or 57) being magnetically actuated, while the other remains in retracted position, the circuits being connected up through both switches, one of which must be on contact 52, (or 59). Therefore, in case one valve 7 is approaching closing position, and another is approaching the open position (which only occurs in the event of a clogged duct or other abnormal condition in the system), it is possible for one electro-magnet 50 to be energized from one block of ovens demanding increased gas withdrawal, while the other electro-magnet 56 is energized from another block of ovens demanding a reduced rate of gas withdrawal. Such conditions require manual attention, and therefore I have devised a set of signals which not only indicate all automatic variations in the rate of gas withdrawal, but also signal a failure of control.

It is to be understood that the mains from which the current is supplied for the various devices illustrated are the same mains, that is to say, the three pairs of points marked positive and negative are all connected to the corresponding mains. It is further to be noted that condensers as shown in Fig. 2 may be bridged across the windings of the magnets 50 and 56 so that the kick from the magnets will not mar the contacts controlling such magnets.

*Signaling lamps.*

A series of lamps 61, 62, and 63 are employed which display white, green and red lights respectively. These are connected in the circuits of the motor 30 in shunt across the armature, and in such a manner that when any circuit is closed, two of the lamps will be included in the shunt circuit in parallel, and the third in series with the other two, whereby the two lamps in parallel will receive only a portion of the current, and will be dimly lighted, while the third lamp, receiving all the current, will be brightly lighted.

Referring to Figure 2, it will be seen that when the right hand magnetic switch is energized to connect up the circuit from the switch lever 51 to contact 53, the circuit of the lamps will be established as follows. From line 65 on the positive side to 66 through shunt lines 67 and 68, the red and green lamps 63 and 62 in parallel, and the white lamp 61 in series, and thence through conductor 69 and closed switch 51 to the minus side of the line.

When switch 57 is closed with switch 51 open, the shunt circuit of the lamps will be from lines 65 and 70 through conductors 67 and 69 to the red and white lamps in parallel, and through the green lamp in series, through conductor 68 and switch 57 to the minus sign of the line.

If both switches 51 and 57 should be simultaneously closed through the action of two different valve mechanisms in the system, as above explained, motor 30 will, of course, not be operated, but the shunt circuit will be closed through the lamps from line 65 through conductor 67, red lamp 63, and then in parallel through the white and green lamps 61 and 62 respectively, and by conductors 68 and 69 through both switches 51 and 57 to the minus sign of the line. The lamps which are in parallel will show little, if any, light, and therefore the attendant will in any case be advised whenever either or both of the electro-magnetic switches controlling motor 30 are energized to throw the switches or either of them to motor starting position.

From the foregoing description, it will be apparent that my improved method is not dependent upon the specific apparatus illustrated and described, although it will be found desirable to employ electrical controlling mechanisms at least, and to utilize pontoon switches to connect up the circuits of electro-magnetic switches, which in turn are adapted to connect up the main circuits of the valve adjusting electric motors, and of the speed varying motor respectively.

The most important feature of my invention, however, is to be found in the fact that whenever any valve has been moved to a predetermined degree from normal half open position, in either direction, the speed of the exhauster is automatically varied in such a manner as to correct the conditions which made it necessary to adjust the valve out of said normal position, unless the conditions are due to abnormal causes requiring manual attention, and in such case an appropriate signal is given. And owing to the fact that the regulation of the exhauster speed is dependent upon the valve adjustments instead of being dependent upon changing pressure conditions, resulting from valve adjustments, the variations in exhauster speed will anticipate the tendency to pressure changes in the outlet main, and thus prevent excessive changes, such as would require re-correction, with hunting or see-sawing effect.

The term "exhauster" as herein used is intended to be generic to any apparatus for withdrawing gas from the ovens, whether by means of a single pump, a set of pumps, or any other gas withdrawing devices.

I claim:—

1. The method of automatically regulating the pressure of gas in a series of gas producing chambers having separate connections with a common outlet, consisting in continuously exhausting gas from the outlet, separately throttling the connections between the respective chambers and the outlet, in inverse correspondence to the pressure in such chambers, and separately varying the rate of gas withdrawal at the outlet when the degree of variation in any duct exceeds a predetermined limit.

2. The method of regulating the pressure of gas in a series of gas producing chambers having separate connections with a common outlet, consisting in continuously exhausting gas from the outlet, separately varying the capacity of said connections with the outlet to increase or diminish the rate of withdrawal in proportion to increasing or decreasing rates of gas production in the respective chambers, and simultaneously varying the rate of gas withdrawal from the outlet in correspondence with predetermined degrees of variation in the capacities of the ducts.

3. The method of automatically regulating the pressure of gas in a series of gas producing chambers, having separate connections with a common outlet, consisting in subjecting the outlet to the suction of a continuously operating exhauster, electrically regulating the operation of the exhauster to vary the rate of gas withdrawal, and utilizing gas pressures in the respective chambers to separately regulate the rate of withdrawal from such chambers, and to co-operatively control the regulating circuit of the exhauster.

4. The method of automatically regulating the pressure of gas in a series of gas producing chambers, having separate connections with a common outlet, consisting in subjecting the outlet to the suction of a continuously operating exhauster, electrically regulating the operation of the exhauster to vary the rate of gas withdrawal, utilizing gas pressures in the respective chambers to separately regulate the rate of withdrawal from such chambers, to co-operatively control the regulating circuit of the exhauster, and to signal the condition of said regulating circuit.

5. Means for automatically regulating the pressure of gas in a series of gas producing chambers, consisting in the combination with said chamber, of a common outlet duct, connecting ducts leading thereto from the respective chambers, a power operated exhauster for the outlet duct, a throttle valve in each connecting duct, means for utilizing gas pressure in the respective chambers to separately adjust the associated throttle valve, and electrical means controlled by the throttle valves, when in predetermined positions of adjustment, for regulating the speed of the exhauster.

6. In an automatic pressure regulating system for gas producers, the combination with pressure controlled means for regulating gas withdrawals in the producer outlet ducts, of a power actuated exhauster connected in common with said ducts, and adapted to withdraw gas therefrom, a reversible electric motor adapted to control the speed of the exhauster, and devices operatively adjustable by said pressure controlled means for connecting up the circuits of said motor.

7. In an automatic pressure regulating system for gas producers, the combination with pressure controlled means for regulating gas withdrawals in the producer outlet ducts, of a power actuated exhauster connected in common with said ducts, and adapted to withdraw gas therefrom, a reversible electric motor adapted to control the speed of the exhauster, and devices operatively adjustable by said pressure controlled means for connecting up the circuits of said motor, when the gas withdrawal of any regulator approaches an extreme position in either direction.

8. In an automatic pressure regulating system for gas producers, the combination with pressure controlled means for regulating gas withdrawals in the producer outlet ducts, of a power actuated exhauster connected in common with said ducts, and adapted to withdraw gas therefrom, a reversible electric motor adapted to control the speed of the exhauster, devices operatively adjustable by said pressure controlled means for connecting up the circuits of said motor, when the gas withdrawal of any regulator approaches an extreme position in either direction, together with means for utilizing said regulators to electrically signal such positions of the regulators.

In testimony whereof I affix my signature in the presence of two witnesses.

WILMER M. SHALLCROSS.

Witnesses:
O. C. WEBER,
A. J. McKERIHAN.